US012749710B2

(12) United States Patent
Tsay et al.

(10) Patent No.: US 12,749,710 B2
(45) **Date of Patent: *Sep. 29, 2026**

(54) ADDITIVE FOR ELECTROLYTE OF SECONDARY LITHIUM BATTERY, ELECTROLYTE FOR SECONDARY LITHIUM BATTERY, AND SECONDARY LITHIUM BATTERY COMPRISING SAME

(71) Applicant: Samsung SDI Co., Ltd., Yongin-si (KR)

(72) Inventors: Olga Tsay, Yongin-si (KR); Soojin Kim, Yongin-si (KR); Hyunbong Choi, Yongin-si (KR); Younghye Kang, Yongin-si (KR); Jin-Hyeok Lim, Yongin-si (KR); Myunghwan Jeong, Yongin-si (KR); Wonseok Cho, Yongin-si (KR); Pavel Shatunov, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 814 days.

This patent is subject to a terminal disclaimer.

(21) Appl. No.: 17/904,869

(22) PCT Filed: Jan. 20, 2021

(86) PCT No.: PCT/KR2021/000802

§ 371 (c)(1),
(2) Date: Aug. 23, 2022

(87) PCT Pub. No.: WO2021/194074

PCT Pub. Date: Sep. 30, 2021

(65) Prior Publication Data

US 2023/0140494 A1 May 4, 2023

(30) Foreign Application Priority Data

Mar. 24, 2020 (KR) ........................ 10-2020-0035649

(51) Int. Cl.
*H01M 10/0567* (2010.01)
*H01M 4/02* (2006.01)
(Continued)

(52) U.S. Cl.
CPC ....... *H01M 10/0567* (2013.01); *H01M 4/364* (2013.01); *H01M 4/386* (2013.01);
(Continued)

(58) Field of Classification Search
CPC .. H01M 10/0567; H01M 4/364; H01M 4/386; H01M 4/525; H01M 4/583; H01M 2004/027; H01M 2004/028; H01M 4/587
See application file for complete search history.

(56) References Cited

U.S. PATENT DOCUMENTS 12,074,287 B2 * 8/2024 Kim .................... H01M 10/052
2010/0286088 A1 11/2010 Stevens et al.
(Continued)

FOREIGN PATENT DOCUMENTS

GB 1139033 A * 1/1969 ........... C07C 317/00
JP 5390736 B2 1/2014
(Continued)

OTHER PUBLICATIONS

EPO Extended European Search Report dated Apr. 15, 2024, issued in corresponding European Patent Application No. 21776871.2, 9 pages.
(Continued)

*Primary Examiner* — Ula C Ruddock
*Assistant Examiner* — Sydney L Kline
(74) *Attorney, Agent, or Firm* — Womble Bond Dickinson (US) LLP

(57) ABSTRACT

Provided are an additive for the electrolyte of a secondary lithium battery, an electrolyte for secondary lithium battery,
(Continued)

and a secondary lithium battery comprising same, the additive comprising a compound represented by chemical formula 1.

12 Claims, 1 Drawing Sheet

(51) Int. Cl.

*H01M 4/36* (2006.01)
*H01M 4/38* (2006.01)
*H01M 4/485* (2010.01)
*H01M 4/525* (2010.01)
*H01M 4/583* (2010.01)
*H01M 10/0568* (2010.01)

(52) U.S. Cl.

CPC ........... *H01M 4/485* (2013.01); *H01M 4/525* (2013.01); *H01M 4/583* (2013.01); *H01M 10/0568* (2013.01); *H01M 2004/027* (2013.01); *H01M 2004/028* (2013.01)

(56) References Cited

U.S. PATENT DOCUMENTS

| | | | | |
|---|---|---|---|---|
| 2011/0008680 | A1 | 1/2011 | Muldoon et al. | |
| 2013/0330610 | A1* | 12/2013 | Shigematsu ...... | H01M 10/0567 429/200 |
| 2015/0093633 | A1* | 4/2015 | Miyabara .............. | H01M 4/131 429/223 |
| 2016/0013517 | A1 | 1/2016 | Nakazawa et al. | |
| 2016/0351963 | A1* | 12/2016 | Shatunov .......... | H01M 10/0567 |
| 2018/0053967 | A1* | 2/2018 | Koh .................. | H01M 10/0569 |
| 2021/0265662 | A1 | 8/2021 | Kim et al. | |

FOREIGN PATENT DOCUMENTS

| | | | |
|---|---|---|---|
| JP | 2014-146558 | A | 8/2014 |
| JP | 2015-62158 | A | 4/2015 |
| JP | 6031856 | B2 | 11/2016 |
| JP | 2018-125313 | A | 8/2018 |
| KR | 10-2015-0044004 | A | 4/2015 |
| KR | 10-2015-0135278 | A | 12/2015 |
| KR | 10-2016-0141667 | A | 12/2016 |
| KR | 10-2019-0064272 | A | 6/2019 |
| KR | 10-2020-0005369 | A | 1/2020 |
| WO | WO 2009-077741 | A2 | 6/2009 |

OTHER PUBLICATIONS

International Search Report of PCT/KR2021/000802, Apr. 22, 2021, 4 pp.

Japanese Office Action, with English translation, dated Jun. 26, 2023, issued in corresponding Japanese Patent Application No. 2022-535187 (6 pages).

Chinese Office Action for CN Application No. 202180009678.4 dated Mar. 8, 2025, 7 pages.

* cited by examiner

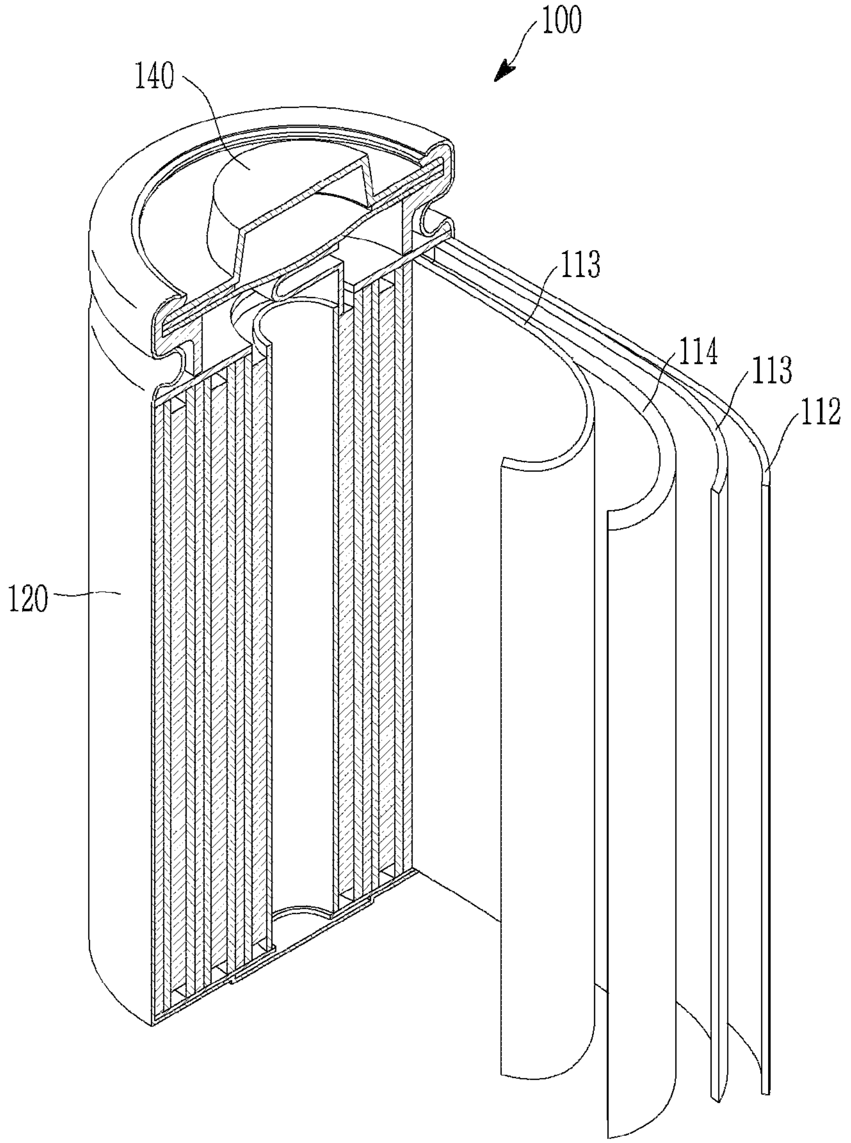
100
140
113
114
113
112
120

ADDITIVE FOR ELECTROLYTE OF SECONDARY LITHIUM BATTERY, ELECTROLYTE FOR SECONDARY LITHIUM BATTERY, AND SECONDARY LITHIUM BATTERY COMPRISING SAME

CROSS-REFERENCE TO RELATED APPLICATIONS

This application is a U.S. National Phase Patent Application of International Patent Application Number PCT/KR2021/000802, filed on Jan. 20, 2021, which claims priority to Korean Patent Application Number 10-2020-0035649, filed on Mar. 24, 2020, the entire content of each of which is incorporated herein by reference.

TECHNICAL FIELD

It relates to an additive for an electrolyte of a secondary lithium battery, an electrolyte for a secondary lithium battery, and a secondary lithium battery including the same.

BACKGROUND ART

Secondary lithium batteries are attracting attention as power sources for various electronic devices because of high discharge voltage and high energy density.

As for positive active materials of secondary lithium batteries, a lithium-transition metal oxide having a structure capable of intercalating lithium ions such as $LiCoO_2$, $LiMn_2O_4$, $LiNi_{1-x}Co_xO_2$ ($0<x<1$), and the like has been used.

As for negative active materials, various carbon-based materials such as artificial graphite, natural graphite, and hard carbon capable of intercalating and deintercalating lithium ions have been mainly used.

As for electrolytes of secondary lithium batteries, an organic solvent in which a lithium salt is dissolved has been used.

Technical Problem

One embodiment provides an additive for an electrolyte of a secondary lithium battery being capable of decreasing battery resistance, particularly suppressing increases in battery resistance at high temperatures storage to improve battery performances, and improving the cycle-life characteristics at room temperature.

Another embodiment provides an electrolyte for a secondary lithium battery including the additive.

Still another embodiment provides a secondary lithium battery including the electrolyte.

Technical Solution

According to one embodiment, an additive for an electrolyte of a secondary lithium battery including a compound represented by Chemical Formula 1 is provided.

Chemical Formula 1

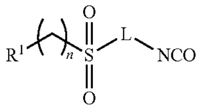

(in Chemical Formula 1, $R^1$ is a substituted or unsubstituted alkyl group or isocyanate group, L is a substituted or unsubstituted alkylene group, or a substituted or unsubstituted alkenylene group, and n is one of integers of 0 to 10)

The additive may be represented by Chemical Formula 1a or Chemical Formula 1b.

Chemical Formula 1a

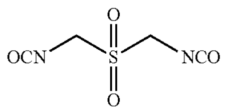

Chemical Formula 1b

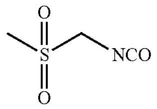

Another embodiment provides an electrolyte for a secondary lithium battery, including a non-aqueous organic solvent, a lithium salt, and the additive represented by Chemical Formula 1.

An amount of the additive may be 0.1 wt % to 3 w % based on 100 wt % of the total weight of the electrolyte, and according to one embodiment, may also be 0.3 wt % to 2 wt %.

The electrolyte may further include an additional-additive selected from fluoroethylene carbonate (FEC), vinylene carbonate (VC), succinonitrile (SN), hexane tricyanide, $LiBF_4$, or a combination thereof.

An amount of the additional additive may be 0.1 wt % to 10 wt % based on 100 wt % of the total weight of the electrolyte.

Another embodiment provides a secondary lithium battery including a positive electrode including a positive active material; a negative electrode including a negative active material; and the electrolyte.

The positive active material may be represented by Chemical Formula 4.

Chemical Formula 4

$$Li_xNi_yCo_zAl_{1-y-z}O_2$$

(in Chemical Formula 4, $1\leq x\leq 1.2$, $0.5\leq y\leq 1$, and $0\leq z\leq 0.5$)

The negative active material may include a Si—C composite including a Si-based active material and a carbon-based active material. Furthermore, the negative active material may include crystalline carbon.

Other embodiments are included in the following detailed description.

Advantageous Effects

An additive of secondary lithium battery according to one embodiment of the present invention may decrease battery resistance, and particularly may suppress battery resistance at high temperature storage to improve battery performance and may improve the cycle-life characteristics at room temperature.

BRIEF DESCRIPTION OF THE DRAWING

FIG. 1 is a schematic view showing a structure of the secondary lithium battery according to one embodiment.

MODE FOR INVENTION

Hereinafter, embodiments of the present invention are described in detail. However, these embodiments are examples, the present invention is not limited thereto, and the present invention is defined by the scope of claims.

One embodiment provides an additive including a compound represented by Chemical Formula 1.

Chemical Formula 1

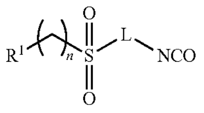

In chemical formula 1, $R^1$ is a substituted or unsubstituted alkyl or isocyanate, L is a substituted or unsubstituted alkylene, or a substituted or unsubstituted alkenylene, and n is one of integers of 0 to 10.

According to one embodiment, a substituent in the substituted alkyl, the substituted alkylene, or the substituted alkenylene may be an alkyl, a halogen, or an aromatic group.

The alkyl may be C1 to C5 alkyl group.

Furthermore, the alkylene group may be a C1 to C5 alkylene group and the alkenylene group may be C2 to C6 alkenylene group. When the carbon numbers in the alkylene and alkenylene fall into the above range, the improved characteristics at a high temperature may be exhibited.

In one embodiment, the examples of the additive of Chemical Formula 1 may be Chemical Formula 1a or Chemical Formula 1b.

Chemical Formula 1a

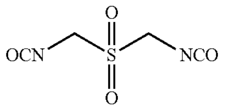

Chemical Formula 1b

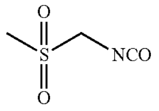

When the battery including the additive of Chemical Formula 1 is stored, particularly at high temperatures, reduction-decomposition of the non-aqueous organic solvent at a surface of the negative electrode may be effectively suppressed. This is considered to be because the additive of Chemical Formula 1 may react with oxygen groups generally chemisorbed on the negative electrode or by forming a very robust and stable SEI layer at high temperatures.

In addition, according to use of the electrolyte including the additive with the isocyanate (—NCO) group, electrochemical polymerization of the isocyanate (—NCO) group gives polyamide-like SEI components and may form a compact and stable SEI film, so that the additional reduction of the non-aqueous organic solvent of the electrolyte may be suppressed, and the side-reaction of the electrolyte may be suppressed, thereby forming an SEI film with low resistance, and reducing internal resistance of the battery.

Furthermore, the isocyanate additive may scavenge acidic HF impurities and water which may be present in the electrolyte, and if even a trace of water is present, $LiPF_6$ may be hydrolyzed to release acidic HF, which causes shortcomings such as decomposition of the SEI components and dissolution of the positive active material, thereby the shortcomings related to HF may be prevented, so improvements in cycle-life characteristics and cell impedance may be obtained.

In addition, when the additive including a sulfonyl group and an isocyanate group as with Chemical Formula 1 is used in the electrolyte, the battery characteristics such as high temperature storage stability and cycle stability may be improved.

As such, the additive of Chemical Formula 1 includes at least an isocyanate group (NCO) and a sulfonyl group ($SO_2$) and is a compound in which the isocyanate group is bonded to the sulfonyl group via a linking group L, and particularly, it has the isocyanate group bonded to the sulfonyl group via a linking group L, and thus, increases in battery resistance may be suppressed and the cycle-life characteristics may be improved. If any compound includes only one of the isocyanate group and the sulfonyl group, it is difficult to improve battery characteristics of both high temperature storage stability and cycle stability, and even if both the isocyanate group and the sulfonyl group are included, when the isocyanate group is directly bonded to the sulfonyl group, it is not desirable because the compound has extremely high reactivity which causes severe decomposition of the negative electrode and produces a very thin film on the surfaces of the negative electrode and the positive electrode.

Another embodiment provides an electrolyte for a secondary lithium battery including a non-aqueous organic solvent, a lithium salt, and the additive represented by Chemical Formula 1.

In one embodiment, the amount of the additive may be 0.1 wt % to 3 wt % based on the total weight of the electrolyte, and may also be 0.3 wt % to 2 wt %. When the amount of the additive is within the above range, the battery resistance may be decreased, and particularly, the increases in the battery resistance at high temperature storage may be effectively suppressed, so that the battery performances may be effectively improved, and the cycle-life characteristics at room temperatures may be improved. If the amount of the additive is less than 0.1 wt %, the effects of reducing the battery resistance and for improving the cycle-life characteristics may be insignificant, and if the amount is more than 3 wt %, the thin film is excessively formed on the electrode so that the battery characteristics such as storage characteristics at a high temperature may be deteriorated.

The electrolyte may include the additive as a first additive, and may further include an additional additive, i.e., a second additive, selected from fluoroethylene carbonate, vinylene carbonate, succinonitrile, hexane tricyanide, $LiBF_4$, or a combination thereof. If the additional additive (second additive) is further included, a more robust thin layer may be formed on the surface of the negative electrode and the interface of the positive electrode may be stable, and thus the additional electrolyte decomposition may be further inhibited. If the additional additive (second additive) is further included, the amount of the additional additive (second additive) may be 0.1 wt % to 10 wt % based on the total weight of the electrolyte. When the additional additive (second additive) is included in an amount of the above range, the effects from the use of the second additive may be further obtained. If the amount of the additional additive (second additive) is used in excess of the above content, the resistance may be excessively increased so that battery deterioration may occur during repeated charge and discharge cycles. When fluoroethylene carbonate (FEC), vinylene carbonate (VC), succinonitrile (SN), hexane tricyanide, or $LiBF_4$ are mixed and used as the additional additive (second additive), a mixture ratio may be suitably controlled and there is no need to limit it.

The non-aqueous organic solvent serves as a medium for transmitting ions taking part in the electrochemical reaction of a battery.

The non-aqueous organic solvent may include a carbonate-based, ester-based, ether-based, ketone-based, alcohol-based, or aprotic solvent.

The carbonate-based solvent may be dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like, and the ester-based solvent may be methyl acetate, ethyl acetate, n-propyl acetate, dimethylacetate, methylpropionate, ethylpropionate, γ-butyrolactone, decanolide, valerolactone, mevalonolactone, caprolactone, and the like. the ester-based solvent may be methyl acetate, ethyl acetate, n-propyl acetate, dimethylacetate, methylpropionate, ethylpropionate, γ-butyrolactone, decanolide, valerolactone, mevalonolactone, caprolactone, and the like.

The ether-based solvent may be dibutyl ether, tetraglyme, diglyme, dimethoxyethane, 2-methyltetrahydrofuran, tetrahydrofuran, and the like, and the ketone-based solvent may be cyclohexanone, and the like.

The alcohol-based solvent may be ethanol, isopropyl alcohol, and the like, and the aprotic solvent may be nitriles such as R—CN (wherein R is a C2 to C20 linear, branched, or cyclic hydrocarbon group, or may include a double bond aromatic ring, or an ether bond), amides such as dimethyl formamide, and the like, dioxolanes such as 1,3-dioxolane, and the like, and sulfolanes, and the like.

The organic solvent may be used alone or in a mixture. When the organic solvent is used in a mixture, a mixture ratio may be suitably controlled in accordance with a desirable battery performance, which may be understood by a person having ordinary skill in this art.

In addition, the carbonate-based solvent may include a mixture of a cyclic carbonate and a linear (chain) carbonate. In this case, when the cyclic carbonate and the linear carbonate are mixed together in a volume ratio of 1:1 to 1:9, performance of an electrolyte solution may be enhanced.

The organic solvent of the disclosure may further include an aromatic hydrocarbon-based organic solvent in addition to the carbonate-based solvent.

Herein, the carbonate-based solvent and the aromatic hydrocarbon-based organic solvent may be mixed in a volume ratio of 1:1 to 30:1.

The aromatic hydrocarbon-based organic solvent may be an aromatic hydrocarbon-based compound of Chemical Formula 2.

Chemical Formula 2

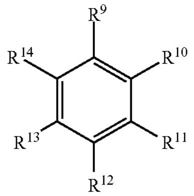

(In Chemical Formula 2, $R^9$ to $R^{14}$ are the same or different, and are selected from the group consisting of hydrogen, a halogen, a C1 to C10 alkyl group, a haloalkyl group, and a combination thereof.)

Specific examples of the aromatic hydrocarbon-based organic solvent may be selected from the group consisting of benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5 -trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

The electrolyte may further include vinylene carbonate or an ethylene carbonate-based compound of Chemical Formula 3 as an additive for improving the cycle-life in order to improve cycle-life of a battery.

Chemical Formula 3

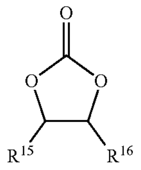

(In Chemical Formula 3, $R^{15}$ and $R^{16}$ are the same or different and are selected from hydrogen, a halogen, a cyano group (CN), a nitro group ($NO_2$), and a fluorinated C1 to C5 alkyl group, provided that at least one of $R^{15}$ and $R^{16}$ is selected from a halogen, a cyano group (CN), a nitro group ($NO_2$), and a fluorinated C1 to C5 alkyl group, and $R^{15}$ and $R^{16}$ are not simultaneously hydrogen.)

Examples of the ethylene carbonate-based compound may be difluoro ethylene carbonate, chloroethylene carbonate, dichloroethylene carbonate, bromoethylene carbonate, dibromoethylene carbonate, nitroethylene carbonate, cyanoethylene carbonate, etc. The amount of the additive for improving cycle-life may be used within an appropriate range.

The lithium salt dissolved in an organic solvent supplies a battery with lithium ions, basically operates the secondary lithium battery, and improves transportation of the lithium ions between a positive electrode and a negative electrode. Examples of the lithium salt include one, or two or more, selected from $LiPF_6$, $LiSbF_6$, $LiAsF_6$, $LiPO_2F_2$, $LiN(SO_2C_2F_5)_2$, $Li(CF_3SO_2)_2N$, $LiN(SO_3C_2F_5)_2$, $Li(FSO_2)_2N$ (lithium bis(fluorosulfonyli)mide: LiFSI), $LiC_4F_9SO_3$, $LiClO_4$, $LiAlO_2$, $LiAlCl_4$, $LiN(C_xF_{2x+1}SO_2)(C_yF_{2y+1}SO_2)$, wherein x and y are natural numbers, for example, an integer of 1 to 20), lithium difluorobis(oxolato) phosphate, LiCl, LiI, $LiB(C_2O_4)_2$(lithium bis(oxalato) borate: LiBOB), and lithium difluoro(oxalato)borate(LiDFOB), as a supporting electrolyte salt. A concentration of the lithium salt may range from 0.1 M to 2.0 M. When the lithium salt is included at the above concentration range, an electrolyte may have excellent performance and effective lithium ion mobility due to optimal electrolyte conductivity and viscosity.

Another embodiment provides a secondary lithium battery including the electrolyte, a positive electrode, and a negative electrode.

The positive electrode includes a current collector and a positive active material layer formed on the current collector, and including a positive active material.

In the positive active material layer, as the positive active material, a compound being capable of reversibly intercalating and deintercalating lithium (a lithiated intercalation compound) may be used, and as a specific example, one or more composite oxides of a metal selected from cobalt, manganese, nickel, or a combination thereof, and lithium, may be used. As more specific examples, compounds represented by one of the following chemical formulae may be used. $Li_aA_{1-b}X_bD_2$ ($0.90 \le a \le 1.8$, $0 \le b \le 0.5$); $Li_aA_{1-b}X_bO_{2-c}D_c$ ($0.90 \le a \le 1.8$, $0 \le b \le 0.5$, $0 \le c \le 0.05$); $Li_aE_{1-b}X_bO_{2-c}D_c$ ($0 \le b \le 0.5$, $0 \le c \le 0.05$); $Li_aE_{2-b}X_bO_{4-c}D_c$ ($0 \le b \le 0.5$, $0 \le c \le 0.05$); $Li_aNi_{1-b-c}Co_bX_cD_\alpha$($0.90 \le a \le 1.8$, $0 \le b \le 0.5$, $0 \le c \le 0.5$, $0 < \alpha \le 2$); $Li_aNi_{1-b-c}Co_bX_cO_2\text{-}_\alpha T_\alpha$($0.90 \le a \le 1.8$, $0 \le b \le 0.5$, $0 \le c \le 0.5$, $0 < \alpha < 2$); $Li_aNi_{1-b-c}Co_bX_cO_{2-\alpha}T_2$ ($0.90 \le a \le 1.8$, $0 \le b \le 0.5$, $0 \le c \le 0.5$, $0 < \alpha < 2$); $Li_aNi_{1-b-c}Mn_bX_cD_\alpha$($0.90 \le a \le 1.8$, $0 \le b \le 0.5$, $0 \le c \le 0.5$, $0 < \alpha \le 2$); $Li_aNi_{1-b-c}Mn_bX_cO_{2-\alpha}T_\alpha$($0.90 \le a \le 1.8$, $0 \le b \le 0.5$, $0 \le c \le 0.5$, $0 < \alpha < 2$); $Li_aNi_{1-b-c}Mn_bX_cO_{2-\alpha}T_2$ ($0.90 \le a \le 1.8$, $0 \le b \le 0.5$, $0 \le c \le 0.5$, $0 < \alpha < 2$); $Li_aNi_bE_cG_dO_2$ ($0.90 \le a \le 1.8$, $0 \le b \le 0.9$, $0 \le c \le 0.5$, $0.001 \le d \le 0.1$); $Li_aNi_bCo_cMn_dG_eO_2$ ($0.90 \le a \le 1.8$, $0 \le b \le 0.9$, $0 \le c \le 0.5$, $0 \le d \le 0.5$, $0.001 \le e \le 0.1$); $Li_aNiG_bO_2$ ($0.90 \le a \le 1.8$, $0.001 \le b \le 0.1$) $Li_aCoG_bO_2$ ($0.90 \le a \le 1.8$, $0.001 \le b \le 0.1$); $Li_aMn_{1-b}G_bO_2$ ($0.90 \le a \le 1.8$, $0.001 \le b \le 0.1$); $Li_aMn_2G_bO_4$ ($0.90 \le a \le 1.8$, $0.001 \le b \le 0.1$); $Li_aMn_{1-g}G_gPO_4$ ($0.90 \le a \le 1.8$, $0 \le g \le 0.5$); $QO_2$; $QS_2$; $LiQS_2$; $V_2O_5$; $LiV_2O_5$; $LiZO_2$; $LiNiVO_4$; $Li_{(3-f)}J_2\ PO_{43}$ ($0 \le f \le 2$); $Li_{(3-f)}Fe_2\ PO_{43}$ ($0 \le f \le 2$); $Li_aFePO_4$ ($0.90 \le a \le 1.8$)

In the chemical formulae, A is selected from Ni, Co, Mn, or a combination thereof; X is selected from Al, Ni, Co, Mn, Cr, Fe, Mg, Sr, V, a rare earth element, or a combination thereof; D is selected from O, F, S, P, or a combination thereof; E is selected from Co, Mn, or a combination thereof; T is selected from F, S, P, or a combination thereof; G is selected from Al, Cr, Mn, Fe, Mg, La, Ce, Sr, V, or a combination thereof; Q is selected from Ti, Mo, Mn, or a combination thereof; Z is selected from Cr, V, Fe, Sc, Y, or a combination thereof; and J is selected from V, Cr, Mn, Co, Ni, Cu, or a combination thereof.

The compounds may also have a coating layer on the surface, or may be mixed with another compound having a coating layer. The coating layer may include at least one coating element compound selected from the group consisting of an oxide of a coating element, a hydroxide of a coating element, an oxyhydroxide of a coating element, an oxycarbonate of a coating element, or a hydroxyl carbonate of a coating element. The compound for the coating layer may be amorphous or crystalline. The coating element included in the coating layer may include Mg, Al, Co, K, Na, Ca, Si, Ti, V, Sn, Ge, Ga, B, As, Zr, or a mixture thereof. The coating layer may be disposed in any method having no adverse influence on properties of a cathode active material by using these elements in the compound (for example, spray coating, dipping, and the like), but is not illustrated in more detail since it is well-known in the related field.

According to one embodiment, the positive active material may be represented by Chemical Formula 4.

$$Li_xNi_yCo_zAl_{1-y-z}O_2 \qquad \text{Chemical Formula 4}$$

(In Chemical Formula 4, $1 \le x \le 1.2$, $0.5 \le y \le 1$, and $0 \le z \le 0.5$)

The use of the active material of Chemical Formula 4 as the positive active material may cause an increase in the resistance, but if it is used together with the electrolyte including the additive of Chemical Formula 1 according to one embodiment the increase in the resistance may be effectively suppressed.

In the positive electrode, an amount of the positive active material may be about 90 wt % to about 98 wt % based on a total weight of the positive active material layer.

In one embodiment, the positive active material layer may further include a binder and a conductive material. Herein, each amount of the binder and the conductive material may be about 1 wt % to about 5 wt % based on the total weight of the positive active material layer.

The binder improves binding properties of positive active material particles with one another and with a current collector, and examples thereof may be polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, styrene-butadiene rubber, acrylated styrene-butadiene rubber, an epoxy resin, nylon, and the like, but are not limited thereto.

The conductive material is included to provide electrode conductivity, and any electrically conductive material may be used as a conductive material unless it causes a chemical change. Examples of the conductive material may include a carbon-based material such as natural graphite, artificial graphite, carbon black, acetylene black, ketjen black, a carbon fiber, and the like; a metal-based material of a metal powder or a metal fiber including copper, nickel, aluminum, silver, and the like; a conductive polymer such as a polyphenylene derivative, or a mixture thereof.

The current collector may be an aluminum foil, a nickel foil, or a combination thereof, but is not limited thereto.

The negative electrode may include a current collector and a negative active material layer formed on the current collector and including a negative active material.

The negative active material may be a material that reversibly intercalates/deintercalates lithium ions, a lithium metal, a lithium metal alloy, a material capable of doping and dedoping lithium, or a transition metal oxide.

The material that reversibly intercalates/deintercalates lithium ions may be a carbon material, and may be any carbon-based negative active material that is generally used in a secondary lithium battery. Examples of the carbon-based negative active material may be crystalline carbon, amorphous carbon, or a combination thereof. Examples of the crystalline carbon may be a graphite such as an unspecified shape, sheet shaped, flake shaped, spherically shaped, or fiber-shaped natural graphite or artificial graphite, and examples of the amorphous carbon may be soft carbon or hard carbon, a mesophase pitch carbonized product, fired cokes, and the like.

The lithium metal alloy may include an alloy of lithium and a metal selected from the group consisting of Na, K, Rb, Cs, Fr, Be, Mg, Ca, Sr, Si, Sb, Pb, In, Zn, Ba, Ra, Ge, Al, and Sn.

The material capable of doping and dedoping lithium may be Si, a Si—C composite, $SiO_x$ ($0<x<2$), a Si-Q alloy (wherein Q is an element selected from the group consisting of an alkali metal, an alkaline-earth metal, a Group 13 element, a Group 14 element, a Group 15 element, a Group 16 element, a transition element, a rare earth element, and a combination thereof, and not Si), Sn, $SnO_2$, a Sn—R alloy (wherein R is an element selected from the group consisting of an alkali metal, an alkaline-earth metal, a Group 13 element, a Group 14 element, a Group 15 element, a Group 16 element, a transition element, a rare earth element, and a combination thereof, and not Sn), and the like, and at least one thereof may be mixed with $SiO_2$. The elements Q and R may be selected from the group consisting of Mg, Ca, Sr, Ba, Ra, Sc, Y, Ti, Zr, Hf, Rf, V, Nb, Ta, db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, TI, Ge, P, As, Sb, Bi, S, Se, Te, Po, and a combination thereof.

The transition metal oxide may be lithium titanium oxide.

The negative active material according to one embodiment may include a Si—C composite including a Si-based active material and a carbon-based active material.

The Si-based active material may be Si, $SiO_x$ ($0<x<2$), a Si-Q alloy (wherein Q is an element selected from the group consisting of an alkali metal, an alkaline-earth metal, a Group 13 element, a Group 14 element, a Group 15 element, a Group 16 element, transition elements, a rare earth element, and a combination thereof, and not Si), or a combination thereof.

The silicon-based active material may have an average particle diameter of 50 nm to 200 nm.

When the particle diameter of the Si particle is within the range, volume expansion caused during charge and discharge may be suppressed, and breakage of the conductive path due to crushing of particles may be prevented.

The Si-based active material may be included in amount of 1 to 60 wt % based on the total weight of the Si—C composite, and for example 3 to 60 wt %.

The negative active material according to another embodiment may further include crystalline carbon, together with the Si—C composite.

In the case of including both the Si—C composite and the crystalline carbon as the negative active material, the Si—C composite and the crystalline carbon may be included in a form of a mixture, and herein, the Si—C composite and the crystalline carbon may be included at a weight ratio of 1:99 to 50:50. More specifically, the Si—C composite and crystalline carbon may be included at a weight ratio of 5:95 to 20:80.

The crystalline carbon, may, for example, include graphite, and specifically, may include natural graphite, artificial graphite, or a mixture thereof.

The crystalline carbon may have an average particle diameter of 5 μm to 30 μm.

In the specification, the average particle diameter may be a particle diameter (D50) at 50 vol % in a cumulative size-distribution curve.

The Si—C composite may further include a shell surrounding a surface of the Si—C composite, and the shell may include amorphous carbon. A thickness of the shell may be 5 nm to 100 nm.

The amorphous carbon may include soft carbon, hard carbon, mesophase pitch carbide, sintered cokes, or a mixture thereof.

The amorphous carbon may be included at 1 part by weight to 50 parts by weight, for example, 5 parts by weight to 50 parts by weight, or 10 parts by weight to 50 parts by weight, based on 100 parts by weight of the carbon-based active material.

The use of the Si—C composite as the negative active material may cause the disadvantage of increasing resistance, but when it is used together with the electrolyte including the additive of Chemical Formula 1, the increase in resistance may be effectively suppressed.

The negative active material layer may include a negative active material and a binder, and may optionally further include a conductive material.

In the negative active material layer, the negative active material may be included in an amount of about 95 wt % to about 99 wt % based on the total weight of the negative active material layer. In the negative active material layer, a weight of the binder may be about 1 wt % to about 5 wt % based on the total weight of the negative active material layer. When the negative active material layer includes a conductive material, the negative active material layer includes about 90 wt % to about 98 wt % of the negative active material, about 1 wt % to about 5 wt % of the binder, and about 1 wt % to about 5 wt % of the conductive material.

The binder improves binding properties of negative active material particles with one another and with a current collector. The binder includes a non-water-soluble binder, a water-soluble binder, or a combination thereof.

The non-water-soluble binder may include an ethylene propylene copolymer, polyacrylonitrile, polystyrene, polyvinylchloride, carboxylated polyvinyl chloride, polyvinyl fluoride, polyurethane, polytetrafluoroethylene, polyvinylidene fluoride, polyethylene, polypropylene, polyamideimide, polyimide, or a combination thereof.

The water-soluble binder may include a styrene-butadiene rubber, an acrylated styrene-butadiene rubber, an acrylonitrile-butadiene rubber, an acryl rubber, a butyl rubber, a fluorine rubber, an ethylene oxide-containing polymer, polyvinylpyrrolidone, polyepichlorohydrin, polyphosphazene, an ethylene propylene diene copolymer, polyvinylpyridine, chlorosulfonated polyethylene, latex, a polyester resin, an acryl resin, a phenol resin, an epoxy resin, polyvinyl alcohol, or a combination thereof.

When the water-soluble binder is used as a negative electrode binder, a cellulose-based compound may be further used to provide viscosity as a thickener.

The cellulose-based compound includes one or more of carboxylmethyl cellulose, hydroxypropylmethyl cellulose, methyl cellulose, or alkali metal salts thereof. The alkali metal may be Na, K, or Li. The thickener may be included in an amount of about 0.1 parts by weight to about 3 parts by weight based on 100 parts by weight of the negative active material.

The conductive material is included to provide electrode conductivity, and any electrically conductive material may be used as a conductive material unless it causes a chemical change. Examples of the conductive material may include a carbon-based material such as natural graphite, artificial graphite, carbon black, acetylene black, ketjen black, denka black, carbon fiber, and the like; a metal-based material of a metal powder or a metal fiber including copper, nickel, aluminum, silver, and the like; a conductive polymer such as a polyphenylene derivative; or a mixture thereof.

The current collector may include one selected from a copper foil, a nickel foil, a stainless steel foil, a titanium foil, a nickel foam, a copper foam, a polymer substrate coated with a conductive metal, and a combination thereof, but is not limited thereto.

The positive active material layer and the negative active material layer may be formed by mixing an active material, a binder, and optionally a conductive material in a solvent to prepare each active material composition, and applying the active material composition to a current collector. Since such a method for forming an active material layer is widely known in the art, a detailed description thereof will be omitted herein. The solvent includes N-methylpyrrolidone and the like, but is not limited thereto. In addition, when a water-soluble binder is used for the negative active material layer, water may be used as a solvent used in preparing the negative active material composition.

Furthermore, depending on a kind of the secondary lithium battery, a separator may also be positioned between the positive electrode and the negative electrode. Examples of a separator material include polyethylene, polypropylene, polyvinylidene fluoride, and multi-layers of two or more layers thereof, and may also include mixed multi-layers such as a polyethylene/polypropylene double-layered separator, a polyethylene/polypropylene/polyethylene triple-layered separator, and a polypropylene/polyethylene/polypropylene triple-layered separator.

FIG. 1 is an exploded perspective view of a secondary lithium battery according to one embodiment. The secondary lithium battery according to an embodiment is illustrated as a prismatic battery but is not limited thereto and may include variously-shaped batteries such as a cylindrical battery, a pouch battery, and the like.

Referring to FIG. 1, a lithium secondary battery 100 according to an embodiment includes: a battery assembly including a positive electrode 114, a negative electrode 112 facing the positive electrode 114, a separator 113 disposed between the positive electrode 114 and the negative electrode 112, and an electrolyte (not shown) immersed in the positive electrode 114, the negative electrode 112, and the separator 113; a battery case 120 housing the battery assembly; and a sealing member 140 sealing the battery case 120.

EXAMPLES FOR PERFORMING INVENTION

Hereinafter, examples of the present invention and comparative examples are described. These examples, however, are only examples of the present invention, and the present invention is not limited thereto.

(Preparation Example 1) Preparation of Dimethyl Sulfone Diisocyanate of Chemical Formula 1a Dimethyl thiodiglycolate was prepared by a method illustrated in Tetrahedron 2004, 10671.

In a 500 ml round bottom flask, thiodiglycolic acid (50 g, 0.333 mol) was dissolved in dry methanol of 125 ml, and concentrated sulphuric acid (5 ml) was added dropwise thereto. The resulting mixture was refluxed for 24 hours. From the refluxed product, excess methanol was removed by evaporation, and the residue was taken up in ethyl acetate, and washed with a saturated sodium bicarbonate solution until the aqueous layer was neutral. After separating and obtaining an organic layer, it was dried over sodium sulfate and the solvent was removed on a rotary evaporator to yield a light yellow liquid dimethyl thiodiglycolate (50.5 g, 85%).

The prepared dimethyl thiodiglycolate at 30 g (0.168 mol) was added to 165 ml of acetic acid, and then 38 g of 30% hydrogen peroxide was added dropwise thereto at room temperature. The obtained mixture was heated at 45° C. overnight and acetic acid was removed by a rotary evaporator. The resulting solid residue was drained on a glass filter and washed with ether followed by drying (30 g, 85%).

The obtained drying product, diester (4 g, 0.02 mol), was dissolved in a mixture of equal volumes of n-butanol and ethanol (60 ml) at 40° C., and a solution of hydrazine hydrate (3.75 g, 0.06 mol) was added thereto. After refluxing the resulting mixture for 45 minutes, it was cooled to 0° C., filtrated, and dried to collect dihydrazide of sulfonyl diacetic acid. The dihydrazide was dissolved in a biphasic solution of 1 M $HCl/CHCl_3$ (60/60 ml), and an aqueous solution of $NaNO_2$ (3.9 g in 20 ml $H_2O$) was added dropwise thereto at 0° C. The reaction mixture was stirred for 10 minutes, the organic layer was separated, and the aqueous layer was extracted with $CHCl_3$. The separated organic layer, the combined organic extracts, were dried over $MgSO_4$ at 0° C. and filtrated.

The solution of diacetyl azide in $CHCl_3$ obtained from the filtration was heated slowly until $N_2$ was observed, which occurred at 45° C. The reaction mixture was kept at about 50° C. for 1 hour and was then heated slowly to reflux (about 65° C.). The refluxed product was again refluxed for 1 hour and then cooled to room temperature. The solvent was evaporated from the obtained cooled product to give a white solid. The white solid, a crude product, was treated with dry ether to remove impurities and the insoluble materials were removed by filtrating. The filtrate was evaporated and the resulting solid was added to a small amount of cold dry $CHCl_3$. The resulting product was filtrated and dried under vacuum to prepare dimethyl sulfone diisocyanate of Chemical Formula 1a (2.1 g, 60%).

Chemical Formula 1a

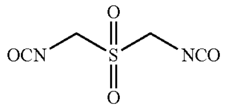

(Preparation Example 2) Preparation of Methyl(Sulfonyl)Methyl Isocyanate of Chemical Formula 1b A compound of Chemical Formula 1b was prepared by the modified method recited in WO2009077741. Methanesulfonyl acetic acid methyl ester (14.9 g, 0.98 mol) was dissolved in a mixture of equal volumes of n-butanol and ethanol (100 ml) and a solution of hydrazine hydrate (9.2 g, 0.147 mol) was added thereto. After refluxing the obtained mixture for 2 hours, it was cooled to 0° C., filtrated, and dried to collect hydrazide of methylsulfonyl acetic acid (13.4 g, 90%).

The hydrazide (5 g, 0.03 mol) was dissolved in a biphasic solution of 1 M $HCl/CHCl_3$ (45 ml/45 ml), and an aqueous solution of $NaNO_2$ (3.17 g in 15 ml $H_2O$) was added dropwise thereto at 0° C. The reaction mixture was stirred for 10 minutes, the organic layer was separated, and the aqueous layer was extracted with $CHCl_3$. The separated organic layer, the combined organic extracts, were dried over $MgSO_4$ at 0° C. and filtrated. The filtrate was evaporated and the resulting solid was added to a small amount of the cold dry $CHCl_3$. The resulting product was filtrated and dried under vacuum to prepare methyl(sulfonyl)methyl isocyanate of Chemical Formula 1b (1.6 g, 36%).

Chemical Formula 1b

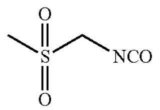

Example 1

A composition of an electrolyte solution was as below.

Composition of Electrolyte Solution

Salt: $LiPF_6$ 1.5 M

Solvent: ethylene carbonate: ethyl methyl carbonate: dimethyl carbonate (EC:EMC:DMC=volume ratio of 2:1:7)

Additive: 0.5 wt % of dimethyl sulfone diisocyanate represented by Chemical Formula 1a Additional additive: fluoroethylene carbonate at 7 wt %, $LiBF_4$ at 0.2 wt %, and succinonitrile at 0.25 wt %

Amounts of the additive and the additional additives were based on 100 wt % of the total weight of the electrolyte Chemical Formula 1a

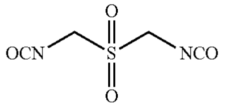

96 wt % of a $LiNi_{0.88}Co_{0.105}Al_{0.015}O_2$ positive active material, 2 wt % of a ketjen black conductive material, and 2 wt % of polyvinylidene fluoride were dissolved in an N-methylpyrrolidone solvent to prepare a positive active material slurry. The positive active material slurry was coated on an aluminum foil, dried, and compressed to produce a positive electrode.

A mixture of natural graphite (average particle diameter D50:5 μm) and a Si—C composite at a 89:11 weight ratio as a negative active material, styrene-butadiene rubber as a binder, and carboxylmethyl cellulose were mixed at a weight ratio of 98:1:1 and dispersed in distilled water to prepare a negative active material slurry.

The Si—C composite had a core including artificial graphite and silicon particles, and soft carbon coated on the core, and herein, the amount of artificial graphite was 40 wt %, the amount of silicon particles was 40 wt %, and the amount of the amorphous carbon was 20 wt % based on the total weight of the Si-carbon composite. The soft carbon coating layer had a thickness of 20 nm and the silicon particles had an average particle diameter D50 of 100 nm.

The negative active material slurry was coated on a copper foil, dried and compressed to produce a negative electrode.

Using the electrolyte, the positive electrode, and the negative electrode, a cylindrical secondary lithium cell was fabricated.

Example 2

A secondary lithium cell was fabricated by the same procedure as in Example 1, except that an electrolyte using 0.5 wt % of an additive of Chemical Formula 1b, instead of the additive of Chemical Formula 1a, was used.

Chemical Formula 1b

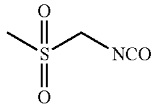

Example 3

A secondary lithium cell was fabricated by the same procedure as in Example 1, except that an electrolyte in the amount of the additive of Chemical Formula 1a that was changed from 0.5 wt % to 0.1 wt %, was used.

Example 4

A secondary lithium cell was fabricated by the same procedure as in Example 1, except that an electrolyte in the amount of the additive of Chemical Formula 1a that was changed from 0.5 wt % to 1 wt %, was used.

Example 5

A secondary lithium cell was fabricated by the same procedure as in Example 1, except that an electrolyte in the amount of the additive of Chemical Formula 1a that was changed from 0.5 wt % to 3 wt %, was used.

Reference Example 1

A secondary lithium cell was fabricated by the same procedure as in Example 1, except that an electrolyte in the amount of the additive of Chemical Formula 1a that was changed from 0.5 wt % to 0.09 wt %, was used.

Reference Example 2

A secondary lithium cell was fabricated by the same procedure as in Example 1, except that an electrolyte in the amount of the additive of Chemical Formula 1a that was changed from 0.5 wt % to 3.1 wt %, was used.

Comparative Example 1

An electrolyte was prepared by the same procedure as in Preparation Example 1, except that a compound of Chemical Formula 1 was not added.

Comparative Example 2

A secondary lithium cell was fabricated by the same procedure as in Example 1 in which an electrolyte using the additive of Chemical Formula 5 at 0.5 wt %, instead of the additive of Chemical Formula 1a, was used.

Chemical Formula 5

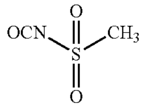

* Evaluation of DC internal resistance (DC-IR: Direct current internal resistance)

The secondary lithium cells according to Examples 1 to 5, Comparative Example 1, and Reference Examples 1 to 2 were allowed to stand at 60° C. for 30 days under a condition of charge (SOC, state of charge=100%) and the resistance increase rates in high temperature storage (60° C.) were measured. The results are shown in Table 1.

The initial DC resistance (DC-IR) was calculated from each current difference and voltage difference when different currents were applied, and they were performed as follows.

The secondary lithium battery was discharged at a constant current of 10 A for 10 seconds under the full-charge state (SOC, state of charge=100%). Next, a constant current discharge of 1 A was performed for 10 seconds, followed by a constant current discharge of 10 A for 4 seconds.

The initial DC resistance (DC-IR) was calculated from the data at 18 seconds and 23 seconds by the equation $\Delta R=\Delta V/\Delta I$. That is, it was obtained from (voltage measured after 10 A for 10 seconds discharge, 1 A for 10 seconds discharge, and 10 A for 4 seconds discharge-voltage measured after 10 A for 10 seconds discharge and 1 A for 8 seconds discharge)/current after 10 A for 10 seconds discharge and 8 seconds discharge.

The high-temperature DC resistance was obtained by discharging the secondary lithium cell at a constant current of 10 A for 10 seconds under a full-charge condition (SOC, state of charge=100%), discharging it at a constant current of 1 A for 10 seconds, discharging at a constant current of 10 A for 4 seconds, storing at 60° C. for 30 days, measuring a voltage value and a current value, and identically calculating to the measurement of the initial DC resistance. In addition, the DC resistance increase rate at a high temperature was calculated from the DC resistance just before storage and the DC resistance after 30 days by Equation 1.

$$\text{DCIR increase rate}=[\text{DCIR}30d.-\text{DCIR}(0d.)]/\text{DCIR}(0d.)\times 100\% \quad \text{Equation 1}$$

In Equation 1, DCIR 30d. indicates DCIR after 30 days, and DCIR (0d.) indicates DCIR just before storage.

TABLE 1

| | Additive | Amount of additive (wt %) | Initial DC-IR (mΩ) | Storage at 60° C. for 30 days DC-IR (mΩ) | Storage at 60° C. for 30 days DC-IR increase rate (%) |
|---|---|---|---|---|---|
| Comparative Example 1 | — | 0 | 21.3 | 30.09 | 41.27 |
| Comparative Example 2 | Chemical Formula 5 | 0.5 | 21.07 | 29.02 | 37.73 |
| Example 1 | Chemical Formula 1a | 0.5 | 21.04 | 27.9 | 32.60 |
| Example 2 | Chemical Formula 1b | 0.5 | 20.61 | 27.82 | 34.98 |
| Example 3 | Chemical Formula 1a | 0.1 | 21.07 | 28.09 | 33.32 |
| Example 4 | Chemical Formula 1a | 1 | 21.02 | 28.2 | 34.16 |
| Example 5 | Chemical Formula 1a | 3 | 21.3 | 29.18 | 37.00 |
| Reference Example 1 | Chemical Formula 1a | 0.09 | 21.25 | 30.01 | 41.22 |
| Reference Example 2 | Chemical Formula 1a | 3.1 | 22.02 | 31.12 | 41.33 |

As shown in Table 1, when the secondary lithium cells according to Examples 1 to 5 using the electrolyte including the additive of Chemical Formula 1a or Chemical Formula 1b had the lower DC-IR increase ratio compared to Comparative Example 1 using the electrolyte with no additive when stored at a high temperature, which indicates a better effect for reducing the resistance increase. Furthermore, even if the additive was used, the DC-IR increase rate in Reference Examples 1 and 2 in which the amount was too small (0.09 wt %) or too excessive (3.1 wt %) was higher than that of Examples 1 to 5, 6, and in particular, in the case of Reference Example 2 using an excessive amount, it can be seen that the DC-IR increase rate is higher than that of Comparative Example 1 in which the additive is not used.

In addition, Comparative Example 2 using the compound of Chemical Formula 5 in which the sulfonyl ($SO_2$) group was directly bonded to the isocyanate (NCO) group exhibited a higher DC-IR increase rate during the high temperature storage, compared to Examples 1 to 5, and thus, the direct bond of the sulfonyl ($SO_2$) group to the isocyanate (NCO) group caused formation of extremely thick films on the surface of the negative electrode and the positive electrode, so that the effects for suppressing the resistance increase were deteriorated.

* Evaluation of cycle-life characteristic

The secondary lithium cells prepared according to Examples 1 to 5, Comparative Example 1 and Reference Examples 1 to 2 were charged and discharged 250 times under the condition of 4 A, 4.2 V, 100 mA cut-off charged at 45° C., rested for 10 minutes, then 10 A, 2.5 V cut-off discharged, and rested for 30 minutes. The discharge capacity at the 1st cycle and the discharge capacity after 500 cycles were measured, the ratio of the 500-cycle discharge capacity to the 1st discharge capacity was calculated, and the 1st discharge capacity (initial discharge capacity), the discharge capacity after 500 cycles, and the capacity retention are shown in Table 2.

TABLE 2

| | Additive | Amount of additive (wt %) | Initial discharge capacity (mAh) | Discharge capacity after 500 cycles (mAh) | Capacity retention (%) |
|---|---|---|---|---|---|
| Comparative Example 1 | — | 0 | 2480 | 1886 | 76 |
| Comparative Example 2 | Chemical Formula 5 | 0.5 | 2488 | 1925 | 77 |
| Example 1 | Chemical Formula 1a | 0.5 | 2475 | 1995 | 81 |
| Example 2 | Chemical Formula 1b | 0.5 | 2480 | 1953 | 79 |
| Example 3 | Chemical Formula 1a | 0.1 | 2476 | 1948 | 79 |
| Example 4 | Chemical Formula 1a | 1 | 2488 | 1978 | 80 |
| Example 5 | Chemical Formula 1a | 3 | 2480 | 1936 | 78 |
| Reference Example 1 | Chemical Formula 1a | 0.09 | 2499 | 1927 | 77 |
| Reference Example 2 | Chemical Formula 1a | 3.1 | 2487 | 1891 | 76 |

As shown in Table 2, Examples 1 and 2 using the electrolytes with the additive of Chemical Formula 1a or Chemical Formula 1b exhibited higher capacity retention after 500 cycles than Comparative Example 1, and the results indicate that the effects for reducing resistance increase were better. In addition, Reference Example 1 with the small amount (0.09 wt %) of the additive or Reference Example 2 with the large amount (3.1 wt %) of the additive, even if the additive was used, exhibited lower capacity retention than Examples 1 to 5.

Furthermore Comparative Example 2 using the compound of Chemical Formula 5 in which the sulfonyl ($SO_2$) group was directly bonded to the isocyanate (NCO) group exhibited lower capacity retention at high temperature storage, compared to Examples 1 to 5, and thus, the direct bond of the sulfonyl ($SO_2$) group to the isocyanate (NCO) group caused formation of extremely thick films on the surface of the negative electrode and the positive electrode, so that the effects for suppressing the resistance increase were deteriorated.

While this invention has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims. Therefore, the aforementioned embodiments should be understood to be exemplary but not limiting the present invention in any way.

The invention claimed is:

1. An additive for an electrolyte of a lithium secondary battery comprising a compound represented by Chemical Formula 1:

[Chemical Formula 1]

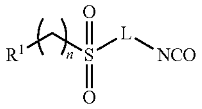

(wherein, $R^1$ is a substituted or unsubstituted alkyl or isocyanate,

L is a substituted or unsubstituted alkylene, or a substituted or unsubstituted alkenylene, and n is one of integers of 0 to 10).

2. The additive for an electrolyte of a lithium secondary battery of claim 1, wherein the additive is represented by Chemical Formula 1a or Chemical Formula 1b:

[Chemical Formula 1a]

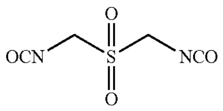

[Chemical Formula 1b]

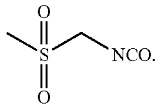

3. An electrolyte of a lithium secondary battery, comprising:

a non-aqueous organic solvent;

a lithium salt; and an additive represented by Chemical Formula 1

[Chemical Formula 1]

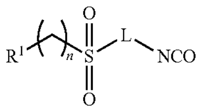

(in Chemical Formula 1, $R^1$ is a substituted or unsubstituted alkyl group or isocyanate group, L is a substituted or unsubstituted alkylene group, or a substituted or unsubstituted alkenylene group, n is an integer of 0 to 10).

4. The electrolyte for a lithium secondary battery of claim 3, wherein an amount the additive is 0.1 wt % to 3 wt % based on 100 wt % of the total weight of the electrolyte.

5. The electrolyte for a lithium secondary battery of claim 3, wherein an amount the additive is 0.3 wt % to 2 wt % based on 100 wt % of the total weight of the electrolyte.

6. The electrolyte for a lithium secondary battery of claim 3, wherein the additive is represented by Chemical Formula 1a or Chemical Formula 1b:

[Chemical Formula 1a]

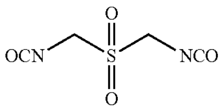

[Chemical Formula 1b]

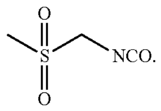

7. The electrolyte for a lithium secondary battery of claim 3, wherein the electrolyte for a lithium secondary battery further includes an additional additive selected from fluoroethylene carbonate (FEC), vinylene carbonate (VC), succinonitrile (SN), hexane tricyanide, $LiBF_4$, or a combination thereof.

8. The electrolyte for a lithium secondary battery of claim 7, wherein a weight of the additional-additive is 0.1 wt % to 10 wt % based on 100 wt % of the total weight of the electrolyte.

9. A lithium secondary battery, comprising:

a positive electrode comprising a positive active material;

a negative electrode comprising a negative active material; and an electrolyte of claim 3.

10. The lithium secondary battery of claim 9, wherein the positive active material is represented by Chemical Formula 4.

$$Li_xNi_yCo_zAl_{1-y-z}O_2$$ (in Chemical Formula 4, $1 \le x \le 1.2$, $0.5 \le y \le 1$, and $0 \le z \le 0.5$).

11. The lithium secondary battery of claim 9, wherein the negative active material comprises a Si—C composite including a Si-based active material and a carbon-based active material.

12. The lithium secondary battery of claim 11, wherein the negative active material further comprises crystalline carbon.

* * * * *